United States Patent [19]

Vaseen

[11] 4,140,608
[45] Feb. 20, 1979

[54] CONVERTING OXYGEN TO OZONE USING A LIQUID DIELECTRIC CONTAINING DISSOLVED OXYGEN

[76] Inventor: Vesper A. Vaseen, 9840 W. 35th Ave., Wheatridge, Colo. 80033

[21] Appl. No.: 826,684

[22] Filed: Aug. 22, 1977

[51] Int. Cl.$^2$ .......................... C01B 13/11; B01K 1/00
[52] U.S. Cl. .................................................. 204/176
[58] Field of Search ................ 204/176; 250/532, 539, 250/540

[56] References Cited

U.S. PATENT DOCUMENTS

| | | | |
|---|---|---|---|
| 1,074,106 | 9/1913 | Dumars | 204/176 |
| 2,992,540 | 7/1961 | Grosse et al. | 62/48 |
| 3,186,930 | 6/1965 | Cook | 204/176 |
| 3,342,721 | 9/1967 | Dibelius et al. | 250/531 |
| 3,766,051 | 10/1973 | Bollyky | 250/540 |

*Primary Examiner*—F.C. Edmundson

[57] ABSTRACT

My invention relates to the use of an inert dielectric solvent liquid of fully halogenated fluorocarbon as the solvent for dissolving under pressure air and oxygen; which liquid acts as the dielectric in an ozone generator; and retains the ozone produced in the corona of the generator in solution in the liquid dielectric, until the pressure is reduced.

For commercial applications, ozone is generated at the point of use by passing oxygen, or oxygen containing gas such as air, through a high-energy electrical discharge called Corona.

The Corona discharge principle is based on a high voltage alternating current between two electrodes which are separated by a layer of dielectric material and a narrow gap through which the oxygen bearing gas is passed. The dielectric is necessary to stabilize the discharge over the entire electrode area so that it does not localize as an intense arc. In the present corona generation of ozone, a substantial fraction of the input energy is converted to heat, which must be removed by heat exchanger.

My invention replaces the dielectric of solid materials; with a dielectric liquid which not only acts as the dielectric, but when compounds such as fluorocarbons are used the oxygen is carried through the corona as dissolved oxygen in solution in the dielectric, which also absorbes the excess heat produced, thus cooling the generator. The generator is operated at a superatmospheric pressure, which permits automatic stripping of the ozone by reducing the pressure following the generator.

4 Claims, No Drawings

CONVERTING OXYGEN TO OZONE USING A LIQUID DIELECTRIC CONTAINING DISSOLVED OXYGEN

BACKGROUND OF THE INVENTION

1. Field of the Invention

Ozone has been called "mother nature's elluent treatment". Ozone ($O_3$) has been used throughout Europe to disinfect and improve the quality of drinking water since 1906. When the first commercial plant for an application of this sort began operating at Nice, France. Several thousand installations are now in operation, the most of which are in Europe. Ozone is used principally in water treatment for taste and odor enhancement. Present day demands for cleaner effluent streams from Industrial Plants, along with simpler, more efficient means of treating municipal sewage indicate the much greater use of ozone, if its cost of production can be kept competitive with chlorine, chlorine dioxide, peroxide, and permanganate.

The more recent findings that chlorinated water may produce carcinogens with trace hydrocarbons is a further reason to expand the use of ozone as a disinfectant and sterilant.

2. Description of Prior Art

The basic elements of an ozonation system are an ozone generator and a mixing tank or column.

The heart of the generator is the ozone producer consisting of a pair of large-area electrodes, either flat or concentric tubular, separated by an air gap and a presence of a high-voltage, high frequency silent electric discharge, or corona, ozone is generated from oxygen in the gap between the electrodes. Most generating units are designed to operate in the 5000 to 25,000 volt range, and at frequencies up to 1000, or more $H_z$.

Many of the operating problems encountered in this type equipment is the heat in the generating area, along with accumulations of nitric acid and nitrogen oxides which occur as by-products of ozone generation from air having a dew point above $-40°$ C. Use of air not only requires drying prior to introduction to the generator, but decreases the oxygen conversion to ozone to 50% of that produced when pure oxygen is used.

Several improvements have been developed in the generation of ozone. Acid-resistant materials have reduced the need for dry air; and electronic circuitry has been fruitful in the design and use of "tuned" circuits that is - spaced or shaped surges of power set resonant circuits "ringing" with a series of descending electronic echoes that maintain the corona at an ozone generating energy level between pulses. This form of electronic coasting has significantly reduced power consumption. Power consumption of 20 watts per gram of ozone has been reduced to $10\pm$.

SUMMARY OF THE INVENTION

This invention is based on two basic factors; that a liquid dielectric can replace the glass, ceramic, and other solid dielectric placed between the electrodes and the oxygen bearing gas stream; and that the dielectric liquid carries the oxygen in solution or dissolved therein, through the conona area in the generator and retains the generated ozone in solution until stripped from the dielectric liquid.

Two means are available for using the ozone produced as an oxidation agent with waste liquids or water treatment.

The ozone can be produced in a pressurized system which makes it possible to retain more oxygen in solution per given volume of liquid dielectric; and also upon release of pressure the ozone being supersaturated is released as a gas.

Heat stripping is physically possible but is very damaging to the ozone efficiency.

The other way the ozone can be used is to mix the dielectric liquid, after passing through the generator, with the waste liquid or water being treated and permit the oxidation to take place as a dual media reaction. The dielectric being non-miscible with water is easily separated from the water phase and recovered for reuse. The dielectric liquids used herewith are those which have general physical/chemical properties as follows.

1. Nominal boiling points several times that of water.
2. Specific gravities either less than or greater than water - for easy separation.
3. Very low vapor pressures - non volatile.
4. Critical temperature several times the boiling point of water.
5. Non-miscible with water.
6. Non-toxic to bio-organisma.
7. Stable physical/chemical characteristics at ambient as well as elevated (600° F.) temperatures; and at superatmospheric pressures - ($10\pm$ atmos.).
8. Reusable for indefinite number of cycles.
9. Non-bio-degradable.
10. Non-oxidizable with ozone.
11. Have an affinity for dissolving oxygen.

This invention is based on the use of a specific dielectric liquid, the fluorocarbons, which comply with the above general specifications.

The process consists of pressurizing the fluorocarbon liquid and saturating with air or preferably with pure oxygen. The oxygen saturated fluorocarbon dielectric is then pumped at a controlled rate through the liquid tight ozone generator between the two electrode which are charged with a high voltage alternating current, with a high frequency. The oxygen is converted to ozone, still soluble in the dielectric liquid which is removed from the generator under pressure. The pressure is reduced to atmospheric which releases the supersaturated ozone as a gas for use. An alternative is to mix the ozonated dielectric liquid with the waste liquid or water being ozone treated; and following the oxidation by ozone separate the treated water from the dielectric liquid. Both an atmospheric or superatmospheric system can be thus used.

DESCRIPTION OF PREFERRED EMBODIMENTS

Ozone

Pure ozone is a toxic, bluish, unstable, potentially explosive gas or under refrigeration a dark blue liquid. The chemical/physical characterists are:

| PHYSICAL CONSTANTS (Formula: $O_3$) | |
| --- | --- |
| Molecular Weight | 47.9982 |
| Boiling Point at 1 atm. | $-169.4°$ F. ($-111.9°$ C.) |
| Freezing Point at 1 atm. | $-314.5°$ F. ($-192.5°$ C.) |
| Density, Gas at 0° C., 1 atm. | 2.143 g./l. |
| Density, Liquid at $-183°$ C. | 1.571 g./ml. |
| Critical Temperature | 10.2° F. ($-12.1°$ C.) |
| Critical Pressure | 802.5 p.s.i.a. (54.6 atm.) (56.4 kg./cm.² absolute) |
| Viscosity, Liquid at $-183°$ C. | 1.57 centipoises |
| Latent Heat of Vaporization at b.p. | 3410 kcal./mole |
| Surface Tension at $-183°$ C. | 38.4 dynes/cm. |

PHYSICAL CONSTANTS
(Formula: O₃)

| | |
|---|---|
| Dielectric Constant, Liquid at −183° C. | 4.79 |
| Dipole Moment | 0.55 D. |
| Solubility in Water at 0° C., 1 atm. | 0.494 volume/ volume water |

At the present time ozone is supplied dissolved in chlorotrifluoromethane ("Freon 13") in stainless steel cylinders. These solutions can be handled safely at vapor phase concentrations up to 20% by volume of ozone. The cylinder pressure is about 475 p.s.i.g. at 20° C. and about 110 p.s.i.g. at −60° C.

Ozone can be supplied dissolved in a "Freon 13" solvent with an initial concentration of 50 liters of gaseous ozone (at S.T.P.) per liter of solution. The solution contain trace amounts of oxygen, which accumulate slowly with ozone decomposition.

HANDLING AND STORAGE - Ozone is supplied to users dissolved in "Freon-13" which decreases, the hazards of handling and using the gas. Since ozone is a gas which has a tendency to decompose, it is essential that the container be stored at low temperatures to decrease the amount of decomposition. To effect this low temperature storage during delivery the cylinder is packed with dry ice in an insulated container which is capable of maintaining low temperatures for approximately 5 days.

Upon receipt of the ozone package it is recommended that a fresh charge of dry ice be put around the cylinder and the unit recharged periodically until the ozone has been expanded or the experiment completed. The ozone cylinder can also be stored in a laboratory deep freeze or dry ice chest.

(NOTE: Permitting the ozone to warm up unnecessarily is not a hazard, but will only result in a more rapid decomposition of the ozone, with the half-life being about 3 days.

| Temperature | Approximate Half-Life of Ozone |
|---|---|
| 20° C. | 3 days |
| −15° C. | 8 days |
| −25° C. | 18 days |
| −50° C. | 3 months |

MATERIALS OF CONSTRUCTION - The preferred materials of construction are: glass, stainless steel, Teflon, Del-F, viton or hypalon, aluminum, tygon, polyvinyl chloride and polyethylene. The use of copper and copper alloys should be avoided because these materials act as a catalyst to promote decomposition. Rubber or any composition thereof is unsuitable. Extreme precaution should be taken to avoid contact with oil, grease or other readily combustible substances.

COMMERCIAL PREPARATION - Ozone is produced by passing a stream of oxygen or air through a generator in which it is subjected to an electrical discharge.

MOLECULAR STRUCTURE - The ozone molecule is angular, with an O-O-O angle of 116°49′ ± 30′ and O-O bond distances of 1.278 ± 0.003 A. The structure involves resonance among the four structures shown, the first two predominating.

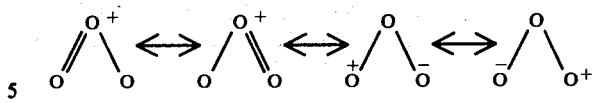

CHEMICAL PROPERTIES - Ozone is second only to fluorine in its oxidizing power. It oxidizes most inorganic compounds to their final oxidative state. For example, ferrous, manganous, and chromous ions are oxidized quantitatively to their respective highest states of oxidation. The addition of ozone to an ethylenic double bond followed by decomposition of the resulting ozonide has long been recognized as the most reliable laboratory procedure for oxidative cleavage, permitting location of the double bond.

As a method of cleavage, the above ozonolysis has the important advantage in that it permits isolation of the primary cleavage products, since the oxidant (ozone) can be removed before the ozonide is cleaved.

Ozonolysis has been extensively used in the laboratory for structural analysis and has also found commercial application for the production of aldehydes and acids. The application of this method has been limited to some extent by the fact that many ozonides are explosive. Explosions can usually be avoided by working at low temperatures (in solvents such as chlorofluoromethane or ethanes, ethyl acetate, carbon tetrachloride, or ethyl chloride) and carrying out the ozonide formation and decomposition in solution, without attempting to isolate the ozonide itself.

Industrial Ozone

Industrial ozone is usually not generated, dissolved in a solvent as above and chilled till use, but rather is an unstable gas considerably diluted with air or oxygen. From a practical standpoint, it is uneconomical or hazardous to concentrate, ship, and store; it should be produced and used as needed. The most economical means of producing ozone in quantity is by passing air or oxygen through a high voltage electrical discharge in a machine called an ozonator. Ozone can be generated from air or from oxygen. However, most ozonators will yield much more ozone when fed with oxygen.

Within limits the concentration of ozone (normally 1 or 2%) can be increased by simply reducing the gas flow through the ozonator; unfortunately, this is accomplished at the cost of a loss in over-all production. The higher one tries to make the ozone concentration, the less ozone one gets per hour from the ozonator. Ozone concentrations of 5% (in air) or 10% (in oxygen) are possible but usually are uneconomical. The yield drops to zero slightly above these limits. The explanation is that the electric discharge not only produces ozone $$3 O_2 \rightarrow 2 O_3$$

but also can destroy it $$2 O_3 \rightarrow 3 O_2$$

the velocity of the reverse reaction increasing with the ozone concentration.

Ozone Generation Basics

When high voltage AC is imposed across a discharge gap in the presence of an oxygen containing gas, ozone is produced. This basic method of production is inherently inefficient. About 10% of the energy supplied is used in production or conversion of oxygen to (1%) ozone. The 90% is lost as light, sound and primarily heat.

The decomposition of ozone back to oxygen is greatly accelerated with increasing temperature, so that all high concentration ozonators must contain a heat removal method.

The gas flow through the gap removes only enough heat to allow production of ozone in concentrations of less than a few tenths of a percent. Ozone production in higher concentrations must be provided a heat removal means.

If a clean, dry, oxygen-rich gas is fed to the ozone generator and an efficient method of heat removal is available, then the production of ozone from a corona under optimum conditions can be represented by the following relationships.

$$V \alpha \, pg$$

$$\frac{Y}{A} \alpha \frac{f \epsilon V^2}{d}$$

Y/A = ozone yield per munit area of electrode surface under optimum conditions.
V = Voltage across the discharge gap (peak)
p = Gas pressure in the discharge gap (psia)
g = Width of the discharge gap
f = Frequency of the applied voltage
$\epsilon$ = Dielectric constant of the dielectric
d = Thickness of the dielectric This invention of the use of a liquid dielectric containing dissolved oxygen alters none of the above relationships; as such a liquid type ozonator operates as though the oxygen gas is a gas in a fluid media rather than a liquid media.

These types of mechanical configurations are currently used. These are the Otto plate type, the tube type, and the Lowther-plate (heat removing) type.

All these mechanical configurations are usable with the liquid dielectric containing dissolved oxygen; by encasing the electrodes in such a manner as to confine the liquid dielectric between the electrodes while it is passing through the machine. It is not the intent of this invention to dictate the mechanical construction.

Dielectric Liquid Absorbants For Oxygen

The dielectric liquids must have certain physical/chemical characteristics in general as follows:
1. Boiling points in excess of 100° C. (212° F.)
2. Low vapor pressures - non volatile
3. Specific heat capacities greater than 0.20
4. Superatmospheric critical pressures
5. Non-miscible with water
6. Non toxic to organic life
7. Stable chemical/physical properties
8. Reusable for inumerable cycles
9. Non-biodegradable
10. Non flammable - no flash point
11. Affinity for dissolving oxygen Of the many dielectric liquids which meet these general conditions, the polyorganosiloxanes and fluorocarbons, in particular, are recommended.

Fluorocarbons are easily made by the reaction of carbon with fluorine.

Removal of hydrogen atoms from the carbon skeleton, either singly or in pairs, is much more easily accomplished than the removal of fluorine atoms. This is a partial explanation of the failure of fluorocarbons to take part in organic chemical reactions. The almost perfect covering power of the fluorine atoms for the carbon skeleton protects the internal force fields and necessitates a much higher energy of activation to initiate reaction for the fluorocarbons than for hydrocarbons.

Solubility Of Air (Oxygen)

Fluorocarbons

Henry's Law constants are inversely proportional to solubility on a mol basis. Fluorocarbon liquid dielectrics have a greater solubility for air components with increasing fluorine saturation. This is demonstrated by the following:

| Solvent | Henry's Law Constants, Atmospheric, at 24° C | | | | |
|---|---|---|---|---|---|
| | Nitrogen | Oxygen | Argon | Krypton | Xenon |
| $CCl_2F_2$ | 420 | 400 | 410 | 230 | 76 |
| $CCl_3F$ | 760 | 530 | 500 | 210 | 62 |
| $C_2ClF_3$ | 340 | 450 | 510 | 360 | 130 |
| $C_2Cl_2F$ | 450 | 410 | 410 | 220 | 72 |
| $C_2Cl_3F_3$ | 650 | 480 | 460 | 200 | 62 |
| $CHClF_2$ | 500 | 410 | 400 | 200 | 65 |
| $CHCl_2F$ | 1100 | 690 | 640 | 230 | 65 |
| $CCl_2F_3$ | 420 | 400 | 410 | 230 | 76 |
| $C_2Cl_2F_4$ | 450 | 410 | 410 | 220 | 72 |
| $C_3Cl_2F_6$ | 460 | 400 | 400 | 210 | 68 |
| $C_4F_{10}$ | 260 | 230 | 230 | 140 | 51 |
| $c\text{-}C_4F_8$ | 300 | 250 | 240 | 140 | 47 |

Regular and related solutions, Hildebrand, Prausnitz and Scott; advise (converted from grams per liter to pounds per 1000 pounds); as follows: (1-atmosphere)

| Solvent | Carbon Dioxide Pounds Per 1000 Pounds Solvent | Nitrogen | Oxygen |
|---|---|---|---|
| $(C_4F_9)_3N$ | 1.46 | 0.134 | 0.072 |
| $C_8F_{16}O$ | 1.95 | 0.181 | 0.093 |

All liquid fluorocarbons, with eight (8) or more carbon atoms, can be used to absorb or dissolve air or oxygen for use in production of ozone. Certain liquid fluorocarbons are more usable than others depending on the particular separation and process operation which takes into account - absorbent capacities, boiling points, critical points, viscosity, and other physical/chemical characteristics of the the absorbent.

Fluorocarbon scrubber or contact liquid used in this process can be one of many such as the group consisting of alkane and cycloalkane derivatives having at least one fluorine atom; perfluoroamines, including hetrocyclic compounds; and perfluoroethers; including heterocyclic compounds. Examples, but not limited thereto are the alkane and cycloalkane derivities - straight chained compounds as $CBrF_3$, $CCl_2F_2$, $CHClF_2$, $C_2Cl_2F_4$, and $C_3Cl_2F_6$. Branched compounds such as $C_5F_{12}$ and cyclic compounds such as $c\text{-}C_4F_8$. A perfluoramine for example could be $(C_4F_9)3_N$ and a perfluorether could be $C_3F_7CF_2OCF_2C_3F_7$. An example of a heterocyclic ether absorbent is:

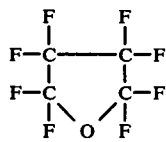

Perfluoro alcohols, ketones, acids and esters of fluorocarbons can be used, but usually less suitable when all properties are considered.

All hydrocarbons can be considered derivatives of methane with hydrocarbon radicals replacing hydrogen atoms. The lack of a measurable dipole moment with hydrocarbons, means that the electric symmetry is not disturbed by replacement of a hydrogen atom with a hydrocarbon radical.

The replacement of the hydrogen atom by a halogen atom as a fluorocarbon radical does, however, introduce a dipole moment. In the fluorocarbon the replacement of a fluorine atom with a fluorocarbon radical does not change the electric symmetry as indicated by the failure to direct a dipole moment. The replacement of a fluorine atom with a hydrogen atom or hydrocarbon radical does, however, introduce a dipole moment.

It is apparent, therefore, that all hydrocarbons can be considered derivatives of methane; but all fluorocarbons are derivatives of methforane. ($CF_2$)

Fluorocarbon oxides are not derivatives of water. They are not ethers. They are properly derivatives of $OF_2$.

Amines are derivatives of ammonia in which one or more of the hydrogen atoms are replaced with organic radicals. Although called amines, there are actually no such structures as fluorocarbon amines, because a fluorocarbon radical attached to a nitrogen atom is a replacement for a fluorine not a hydrogen atom.

The fluorocarbon nitrides, are derivatives of nitrogen trifluoride, not of ammonia.

Derivatives of fluorocarbons are made with fluorocarbon groups attached to almost all other elements other than carbon or fluorine. If the attachment is made to a more electronegative element such as chlorine, oxygen, or nitrogen, a structure results that has a thermal stability and chemical inertness very similar or equal to the fluorocarbon themselves. Fluorocarbons with low electronegative elements attached tend to become less thermally stable and more reactive chemically.

Perfluorocarbons are compounds of carbon and hydrogen in which all the hydrogen atoms attached to the carbon have been replaced by fluorine.

Cyclic fluoroalkylene oxide fluorocarbon compounds, are the cyclic carbon compound which contain only oxygen in addition to the fluorine and carbon. These compounds have a high degree of chemical inertness; they do not burn or react with oxygen, they are colorless; and water insoluble, as well as have an affinity to dissolve gases. Generally these compound with 6 or more carbon atoms are liquid. The larger the number of carbon atoms in the compound generally the higher the boiling point. The general formula for these compounds is $$CF_2(CF_2)_nO$$

where n is an interger having a value of two, three or four.

Compound cyclic fluoroalkylene oxide fluorocarbons are compounds in which one or more of the above are combined to form a single compound.

These compounds constitute the family of fully fluoridated analogues of the family of saturated hydrocarbon alkylene oxides, the carbon-oxygen fluorine skeletal structure being the same but all hydrogen atoms being replaced by fluorine atoms. Additionally this family of compounds embraces cyclic as well as non-cyclic compounds, and poly as well as mono oxides, all of which have their structural alalogues in the hydrocarbon system of oxides.

Unsymmetrical as well as symmetrical compounds are included. The lack of symmetry may arise from different numbers of carbon atoms in the fluorocarbon group, another type of non symmetry exist when the groups differ as to branching, as when one group is branched and the others are normal straight chains or rings.

Fluorocarbon Tertiary Amines

All the fluorocarbon tertiary amines contain only carbon, fluorine and nitrogen atoms and each nitrogen atom is directly bonded to three carbon atoms.

These compounds constitute the family of fully fluoridated analogues of the family of saturated hydrocarbon tertiary amines, the carbon-nitrogen skeletal structures being the same but all hydrogen atoms being replaced by fluorine atoms. Additionally, this family of compounds embraces cyclic as well as non-cyclic compounds, and polyamines as well as nomoamines, all of which have their structural analogues in the hydrocarbon system of tertiary amines.

These compounds which contain five or more carbon atoms in the molecule have boiling points above room temperature and hence are liquid. Compounds containing eight or more carbon atoms in the molecule have boiling points near to or above that of water. The following table illustrates the rise in boiling points with increased carbon atoms.

| COMPOUND | B.P. (° C) |
|---|---|
| $(CF_3)_3N$ | −11 |
| $(C_2F_5)_3N$ | 70 |
| $(C_3F_7)_3N$ | 130 |
| $(C_4F_9)_3N$ | 178 |
| $(C_5F_{11})_3N$ | 218 |
| $(C_6F_{13})_3N$ | 238 |
| $(C_7F_{15})_3N$ | 294 |
| $(C_8F_{17})_3N$ | 321 |
| $(C_{8+x}F_{17+})_3N$ | >321 |

None of the trifluorocarbon amines are water or mineral acid soluble or react chemically with the mineral acids. They all have an affinity for dissolving gases.

This family of tertiary amines includes unsymmetrical as well as symmetrical compounds. The lack of symmetry arises from different numbers of carbon atoms in the various fluorocarbon groups. Another type of non-symmetry exists when the groups differ as to branching, as when one group is branched and the others are normal straight chains or rings.

Fluorocarbons are made which not only include both nitrogen (amines) and oxygen (oxides); but replace one or more of the fluorine atoms with bromine, chlorine, iodines; and one or more of the nitrogen or oxygen atoms with sulphur, phosphorous, mercury, as well as retain some hydrogen atoms.

EXAMPLE

For this example the dielectric cyclic fluoroaklylene oxide ($C_8F_{16}$)O is used in a pressure system of (3) three atmospheres (228 mm Hg); and 21.11° C. (70° F.). The ($C_8F_{16}$)O fluoroalkylene oxide ether liquid has a specific gravity of 1.20 or 10 pounds per gallon (1.20 Kg/L). Oxygen as pure oxygen gas dissolves at 21° C. (70° F.) and three atmospheres at the rate of 0.279 pounds per 1000 pounds of dielectric liquid. (279 Kg per 1000 Kg).

An ozonator individual section with 400 square inches (2581 cm$^{-2}$); 20,000 volts (RMS); and 60Hz with an electrode gap of 0.10" (0.254 cm); and 21° C. (70° F.) inlet dielectric temperature produces 0.05 pounds (0.023 Kg) of (one (1) percent) ozone per hour. Power required is approximately 400 watts. Heat produced is at maximum 360 watts or 20.5 BTU/minute.

The dielectric liquid required to absorb the 0.05 pounds of oxygen per hour is 250.88 pounds (114.03Kg).

The dielectric with a specific heat of 0.27 BTU/pound and a 20.5 BTU/per minute heat production therefore requires 7.59 pounds of dielectric to retain a maximum of 10° F. (7° C.) rise in temperature. Oxygen solubility requires only 2.99#/minute; therefore the heat control quantity controls.

Operation of the sytem requires an accumulation of the number of units required to produce the pounds of ozone desired per unit of time. For instance if the requirement for ozone is 5 pounds per hour, then 100 units of the above are required.

The dielectric liquid at the rate of 420 pounds (30 GPM) is mixed with air at the rate of 4.78 (use 5 to 6) ft$^3$ per minute. (STP) dielectric liquid at 21° C. (70° F.) and three (3) atmospheres will absorb 0.0837 pounds of oxygen per minute thus providing the required 5 pounds per hour.

The 21° C. (70° F.) oxygen saturated dielectric liquid is then pumped at the rate of 420 pounds 30 GPM through the ozonator, hydraulically designed to insure 3 GPM± passes through each section of 400 sq inches (2581 cm$^{-2}$) of electrodes. This amounts to an electrode contact time of approximately 4 seconds per set of electrodes or 0.05#/hour of ozone section or unit.

Ozonated dielectric liquid is cooled by heat exchanger and the pressure reduced to atmospheric. The released gases containing the ozone are then collected for use. The cooled dielectric is then recycled back to process for resaturation with air or oxygen.

When air is used the water vapor in the air will be rejected by the dielectric liquid and can be drained off as necessary.

I claim:

1. A method of generating ozone comprising the steps of
    dissolving oxygen under pressure in a dielectric, liquid halogenated organic solvent inert to ozone;
    passing the solution of oxygen in said inert to ozone solvent through an ozone generator and stripping the ozone formed from the solution.

2. The method of claim 1 in which the inert to ozone organic solvent is selected from the group consisting of halogenated hydrocarbons, cyclic fluoroalkylene oxides, fluorocarbon tertiary amines, fluorocarbon ethers and mixtures thereof.

3. The method of claim 1 in which the stripped organic solvent is recycled.

4. The method of claim 1 in which the oxygen is absorbed under superatmospheric pressure.

* * * * *